Patented Mar. 20, 1951

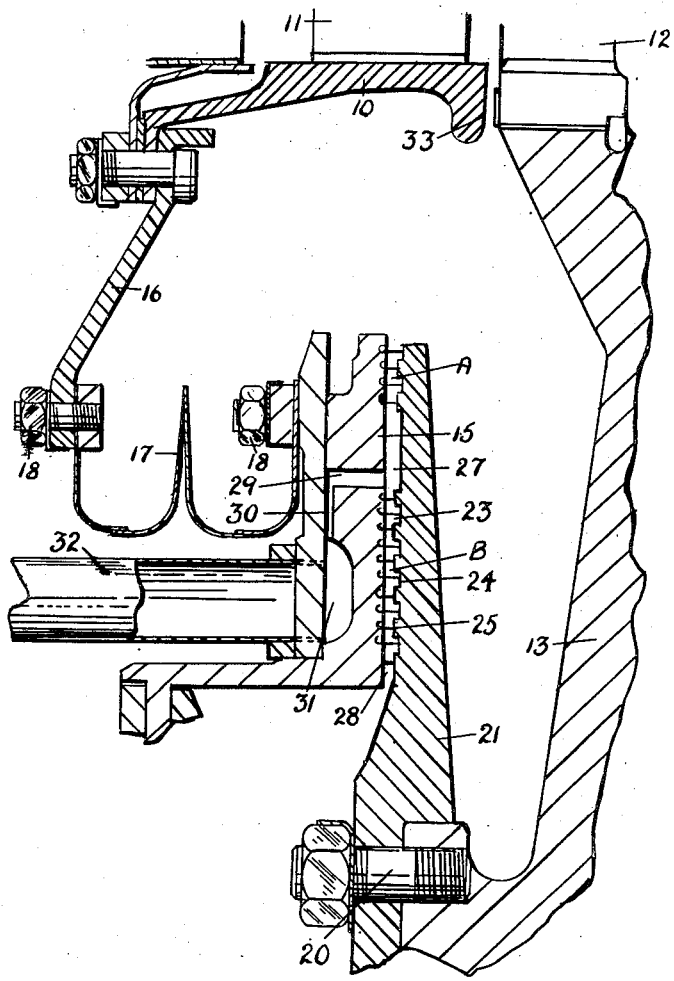

2,545,916

UNITED STATES PATENT OFFICE 2,545,916

LABYRINTH PACKINGS, PARTICULARLY FOR USE IN INTERNAL-COMBUSTION TURBINES

Thomas Clark, Coventry, England, assignor to Armstrong Siddeley Motors Limited, Coventry, England Application October 10, 1947, Serial No. 779,076
In Great Britain August 19, 1947

2 Claims. (Cl. 286—9)

This invention relates to a labyrinth packing, between relatively-rotatable members, for high temperature or other gases.

The main object of the invention is to provide an improved labyrinth packing for use in an internal-combustion turbine where gas temperatures of 800° C. or higher may normally be encountered.

The invention broadly consists in a labyrinth packing having a space between two portions of the packing to which relatively cool air is fed at a pressure in excess of that of the gases.

The invention further consists in a radial labyrinth packing having an annular space between two portions of the packing to which is fed relatively cool air at a pressure in excess of that of the gases, and the portion of the packing on the side of the annular space towards the gases is less (in radial dimension) than the other portion.

The single figure of the accompanying drawings is a fragmentary sectional elevation showing one form of radial labyrinth packing, according to the invention, between relatively-rotatable members of an internal-combustion turbine.

A portion of the turbine stator casing is shown at 10 and part of one of the first circle of stator blades at 11, whilst 12 represents part of one of the first circle of rotor blades carried by the rotor 13. The latter is journalled, as disclosed in British Patent Specification No. 579,775, in a bearing carrier having an annular supporting ring 15. As the rotor shaft (not shown), which is axially located on its left-hand end, may extend axially towards the right as working temperatures are being reached, the bearing supporting ring 15 moving correspondingly to the right to a greater or less extent, the ring 15 is connected to an annular disc 16, fast with the stator casing 10, by means of a flexible bellows device, indicated at 17. This is an annular one, its outside flanges being clamped by means of securing members 18, 18.

The turbine rotor 13 is supported from the rotor shaft by being bolted, as shown at 20, to an annular disc 21 which is actually fast with the shaft, as disclosed in British Patent Specification No. 579,426.

The combustion gases passing between the first circle of the stator blades 11 are at a relatively high temperature of, for example, 800° C. or 900° C., and the problem is to provide a seal for them which will withstand such high temperatures and which will still provide sealing when different extensions occur as working temperatures are being reached, the seal to be between the stator casing 10 and the rotor 13 or between parts attached thereto.

In the present instance the seal or labyrinth packing is a radial one provided between the adjacent radial faces of the discs 15 and 21, and it takes the form of a number of annular sealing strips 23, 23 secured to one of these faces, at different radial spacings, and extending towards and coacting with the other radial face, the latter radial face being formed with a series of annular grooves and ridges, as indicated at 24, 25, or arranged in corresponding manner to provide a staggered (in a radial direction) clearance path.

It will be observed that in the present instance the annular sealing strips 23 are supported by the stationary disc 15, the adjacent surface of the rotor disc 21 having the annular grooves and ridges 24, 25.

In the present instance the labyrinth packing is divided up into two radially-unequal portions, A and B, by an annular space 27, the portion A, between the space 27 and the turbine gases, being shorter in a radial direction than the portion B, between the space 27 and the ambient pressure, obtaining, for example, at 28.

Communicating with the space 27 is a passage 29 connected by a passage 30 to an opening 31 in the interior of the stationary disc 15, which opening is in turn connected to a pipe 32. This latter is supplied by the compressor for the turbine with air which, whilst being raised in temperature to a considerable degree by being compressed, is nevertheless relatively cool compared with the temperature of the combustion gases which leak between the end 33 of the stator casing and the adjacent portion of the rotor 13, and the pressure at which this air is supplied is higher than the pressure of the said gases, for example, by 10 pounds per square inch or so. Thus, if there is a tendency for the axial spacing between the discs 15 and 21 to increase beyond the design limit, the air pressure in the space 27 prevents the passage of the hot gases through the portion B of the labyrinth whilst the compressed air can leak therealong, and some of the latter can in like manner leak through the labyrinth portion A, to be absorbed in the turbine.

In a similar manner, if, in course of time, the labyrinth portion A should deteriorate due to the action of the hot gases, then there will be a greater flow of the relatively cool air through the labyrinth portion A, but the hot gases will be prevented from escaping through the labyrinth portion B.

It will be understood that, in practice, the opening 31 may be an annular one communicating with a plurality of circumferentially-spaced pipes 32 and connected at intervals with the annular space 27 by other passages 29, 30.

What I claim as my invention and desire to secure by Letters Patent of the United States is:

1. In an internal-combustion turbine unit, a rotary turbine member, a stationary member having an annular passage therein concentric with the rotational axis of said rotary turbine member, said rotary and stationary members having adjacent radial faces accessible to the gas pressure of the turbine, a labyrinth packing between said radial faces comprising a plurality of annular strips carried by one of said members and extending towards the other, said strips arranged in two groups which are radially-spaced to provide an annular space between the inner and outer groups of strips, axial duct means in said stationary member adapted to be in registry with the annular space between said two groups of strips, at least one pipe for delivering to said annular passage cooling air at a pressure in excess of that of said gas pressure, and radial duct means carried by said stationary member communicating between said annular passage and axial duct means for delivering said excess pressure air to said annular space whereby to promote a flow of said excess pressure air through the labyrinth in opposition to the gas pressure of the turbine.

2. The combination of claim 1, characterised in that said annular passage of said stationary member is comprised of an annular groove in a radial face of the latter which is remote from the radial face which supports annular strips of the labyrinth packing, and a radial face of a ring held in abutting relationship with the said annularly-grooved face, the said ring having a port which sealingly receives the delivery end of said pipe.

THOMAS CLARK.

REFERENCES CITED

The following references are of record in the file of this patent:

UNITED STATES PATENTS

| Number | Name | Date |
|---|---|---|
| 1,558,587 | Brighouse | Oct. 27, 1925 |
| 2,199,250 | Strobel | Apr. 30, 1940 |
| 2,434,901 | Buch et al. | Jan. 27, 1948 |

FOREIGN PATENTS

| Number | Country | Date |
|---|---|---|
| 28,141 | Great Britain | of 1909 |